United States Patent
Zhang et al.

(10) Patent No.: US 10,880,127 B2
(45) Date of Patent: Dec. 29, 2020

(54) SIGNAL TRANSMISSION METHOD AND APPARATUS

(71) Applicant: Huawei Technologies Co., Ltd., Shenzhen (CN)

(72) Inventors: Jian Zhang, Shenzhen (CN); Haibao Ren, Shanghai (CN); Yuanjie Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/131,599

(22) Filed: Sep. 14, 2018

(65) Prior Publication Data
US 2019/0028305 A1  Jan. 24, 2019

Related U.S. Application Data

(63) Continuation of application No. PCT/CN2016/076522, filed on Mar. 16, 2016.

(51) Int. Cl.
*H04L 25/02* (2006.01)
*H04L 1/00* (2006.01)
(Continued)

(52) U.S. Cl.
CPC ....... *H04L 25/0224* (2013.01); *H04B 7/0404* (2013.01); *H04B 7/0634* (2013.01);
(Continued)

(58) Field of Classification Search
CPC ....... H04L 25/0224; H04L 1/00; H04L 5/005; H04L 25/03898; H04L 27/2607;
(Continued)

(56) References Cited

U.S. PATENT DOCUMENTS

2005/0281279 A1* 12/2005 Dennison ............... H04L 12/28
2011/0200143 A1    8/2011 Koo et al.
(Continued)

FOREIGN PATENT DOCUMENTS

| CN | 101540631 A | 9/2009 |
| CN | 101674655 A | 3/2010 |

(Continued)

OTHER PUBLICATIONS

Mitsubishi Electric, "Performance Evaluation of Rank-1 Precoded SRS," 3GPP TSG RAN WG1 #59bis meeting, R1-100552 Valencia, Spain, Jan. 18-22, 2010, 10 pages.
(Continued)

*Primary Examiner* — Ronald B Abelson
(74) *Attorney, Agent, or Firm* — Slater Matsil, LLP (57) ABSTRACT

The present disclosure relates to the field of mobile communications technologies, and in particular, to a signal transmission method and an apparatus. In the signal transmission method, user equipment receives, from a base station, first information in a physical downlink control channel, where the first information is used for determining precoding information of a sounding reference signal (SRS). The user equipment determines precoding information of the SRS based on the first information. The user equipment performs, based on the precoding information, precoding on the SRS to generate a precoded signal, and sends the precoded signal to the base station.

23 Claims, 7 Drawing Sheets

(51) Int. Cl.
  *H04L 5/00* (2006.01)
  *H04L 25/03* (2006.01)
  *H04L 27/26* (2006.01)
  *H04B 7/0404* (2017.01)
  *H04B 7/06* (2006.01)
  *H04W 72/04* (2009.01)
  *H04L 5/14* (2006.01)

(52) U.S. Cl.
  CPC ............ *H04B 7/0639* (2013.01); *H04L 1/00* (2013.01); *H04L 5/005* (2013.01); *H04L 25/03898* (2013.01); *H04L 27/2607* (2013.01); *H04W 72/042* (2013.01); *H04L 5/0048* (2013.01); *H04L 5/14* (2013.01); *H04L 25/03955* (2013.01)

(58) Field of Classification Search
  CPC . H04W 72/042; H04B 7/0404; H04B 7/0634; H04B 7/0639
  See application file for complete search history.

(56) References Cited

U.S. PATENT DOCUMENTS

| | | | |
|---|---|---|---|
| 2012/0275411 A1 | 11/2012 | Kim et al. | |
| 2013/0028134 A1 | 1/2013 | Wang et al. | |
| 2013/0028211 A1* | 1/2013 | Li | H04W 72/04 |
| 2013/0039319 A1* | 2/2013 | Shi | H04W 72/04 |
| 2013/0107746 A1 | 5/2013 | Wang et al. | |
| 2014/0112168 A1 | 4/2014 | Chen et al. | |
| 2014/0177683 A1* | 6/2014 | Krishnamurthy | H04B 7/0456 |
| 2015/0381246 A1 | 12/2015 | Huang et al. | |
| 2016/0192385 A1* | 6/2016 | Tooher | H04W 72/12 |

FOREIGN PATENT DOCUMENTS

| | | |
|---|---|---|
| CN | 101827444 A | 9/2010 |
| CN | 102170330 A | 8/2011 |
| CN | 102244557 A | 11/2011 |
| CN | 102948186 A | 2/2013 |
| CN | 103905104 A | 7/2014 |
| CN | 104737489 A | 6/2015 |
| EP | 2426831 A1 | 3/2012 |
| JP | 2012506193 A | 3/2012 |
| JP | 2013214955 A | 10/2013 |

OTHER PUBLICATIONS

Panasonic, "Support of precoded SRS for LTE-Advanced", 3GPP TSG RAN WG1 Meeting #59bis,R1-100379, Valencia, Spain, Jan. 18-22, 2010, 5 pages.

Mitsubishi Electric, "Discussion on Precoded SRS," 3GPP TSG RAN WG1 #57bis meeting R1-092441, Los Angeles, USA, Jun. 29-Jul. 3, 2009, 6 pages.

* cited by examiner

SIGNAL TRANSMISSION METHOD AND APPARATUS

CROSS-REFERENCE TO RELATED APPLICATIONS

This disclosure is a continuation of International Application No. PCT/CN2016/076522, filed on Mar. 16, 2016, the disclosure of which is hereby incorporated by reference in its entirety.

TECHNICAL FIELD

The present disclosure relates to the field of mobile communications technologies, and in particular, to a signal transmission method and an apparatus.

BACKGROUND

In a long term evolution (LTE) system, a link from a base station to user equipment (UE) is a downlink channel, and an orthogonal frequency division multiple access (OFDMA) technology is used to improve spectrum efficiency and system capacity; a link from the user equipment to the base station is an uplink channel, and a single-carrier frequency division multiple access (SC-FDMA) technology is used in the LTE system, so that a peak-to-average power ratio (PAPR) is relatively small, reducing difficulty in an implementation of the user equipment.

Currently, the base station may evaluate, based on a sounding reference signal (SRS) received from the user equipment, uplink channel quality of the uplink channel on different time-frequency resources, so that the base station may allocate a time-frequency resource having good uplink channel quality to the user equipment to transmit uplink service data. Further, the base station may estimate an uplink timing advance (TA) based on the sounding reference signal, so that the user equipment keeps uplink synchronization with the base station. In a time division duplex (TDD) mode of the LTE, the base station may further determine downlink channel quality by using the sounding reference signal.

However, as the LTE system evolves toward an LTE Advanced system and even the 5th Generation mobile communications system, a communication frequency between the user equipment and the base station is higher, and a wave effect of a radio electromagnetic wave is weakened. Consequently, coverage of the sounding reference signal sent by the user equipment is reduced, and the base station cannot easily receive the sounding reference signal sent by the user equipment.

SUMMARY

Embodiments of the present disclosure provide a signal transmission method and an apparatus, so as to resolve a problem that a sounding reference signal sent by user equipment cannot be easily received by a base station as communication frequencies become higher.

A first aspect of the embodiments of the present disclosure provides a signal transmission method. The signal transmission method includes determining, by user equipment, precoding information of a sounding reference signal. The method also includes performing precoding on the sounding reference signal based on the precoding information to generate a precoded signal, and sending the precoded signal to a base station serving the user equipment.

With reference to the first aspect, in a first possible implementation of the first aspect, the determining, by user equipment, precoding information of a sounding reference signal includes: receiving, by the user equipment, first information sent by the base station, where the first information is used by the user equipment to determine the precoding information; and determining, by the user equipment, the precoding information based on the first information.

With reference to the first possible implementation of the first aspect, in a second possible implementation of the first aspect, the first information is the precoding information, uplink channel information, or information for triggering the user equipment to determine the precoding information of the sounding reference signal.

With reference to the first possible implementation or the second possible implementation of the first aspect, in a third possible implementation of the first aspect, before the receiving, by the user equipment, first information sent by the base station, the method further includes: sending, by the user equipment, downlink channel quality information to the base station, where the downlink channel quality information is used by the base station to determine that the user equipment performs precoding on the sounding reference signal.

With reference to any one of the first aspect to the third possible implementation of the first aspect, in a fourth possible implementation of the first aspect, the method further includes: before the user equipment determines the precoding information, determining, by the user equipment based on the downlink channel quality information, that precoding needs to be performed on the sounding reference signal.

With reference to any one of the first aspect to the fourth possible implementation of the first aspect, in a fifth possible implementation of the first aspect, the method further includes: determining, by the user equipment, a sending time of the precoded signal.

With reference to the fifth possible implementation of the first aspect, in a sixth possible implementation of the first aspect, the determining, by the user equipment, a sending time of the sounding reference signal includes: receiving, by the user equipment, second information sent by the base station, where the second information indicates the sending time of the precoded signal.

With reference to the fifth possible implementation of the first aspect, in a seventh possible implementation of the first aspect, the signal transmission method further includes: informing, by the user equipment, the base station of the sending time of the precoded signal.

With reference to the second possible implementation of the first aspect, in an eighth possible implementation of the first aspect, the signal transmission method further includes: sending, by the user equipment, the sounding reference signal to the base station at a time other than the sending time of the precoded signal, where the sounding reference signal is used by the base station to determine the uplink channel information.

A second aspect of the embodiments of the present disclosure provides user equipment. The user equipment includes: a processor, a transmitter, and a receiver. The transmitter is configured to perform the sending step performed by the user equipment according to any one of the first aspect to the eighth possible implementation of the first aspect of the embodiments of the present disclosure. The receiver is configured to perform the receiving step performed by the user equipment according to any one of the first aspect to the eighth possible implementation of the first aspect of the embodiments of the present disclosure. The processor is configured to perform the determining step and the generation step performed by the user equipment according to any one of the first aspect to the eighth possible implementation of the first aspect of the embodiments of the present disclosure.

A third aspect of the embodiments of the present disclosure provides a signal transmission method. The signal transmission method includes: sending, by a base station, first information to user equipment served by the base station, where the first information is used by the user equipment to determine precoding information of a sounding reference signal. The method also includes receiving, by the base station, a precoded signal from the user equipment, where the precoded signal is generated by the user equipment by performing, based on the precoding information, precoding on the sounding reference signal.

With reference to the third aspect, in a first possible implementation of the third aspect, the first information is the precoding information, uplink channel information, or information for triggering the user equipment to determine the precoding information of the sounding reference signal.

With reference to the third aspect or the first possible implementation of the third aspect, in a second possible implementation of the third aspect, the method further includes sending, by the base station, second information to the user equipment, where the second information indicates a sending time of the precoded signal.

With reference to the third aspect or the first possible implementation of the third aspect, in a third possible implementation of the third aspect, the method further includes: receiving, by the base station, a notification from the user equipment, where the notification indicates the sending time of the precoded signal.

With reference to the first possible implementation of the third aspect, in a fourth possible implementation of the third aspect, the method further includes: receiving, by the base station, the sounding reference signal from the user equipment at a time other than the sending time of the precoded signal; and determining, by the base station, the uplink channel information based on the sounding reference signal.

With reference to any one of the third aspect to the fourth possible implementation of the third aspect, in a fifth possible implementation of the third aspect, before the base station sends the first information to the user equipment, the method further includes: receiving, by the base station, downlink channel quality information sent by the user equipment, and determining, based on the downlink channel quality information, that the user equipment performs precoding on the sounding reference information.

A fourth aspect of the embodiments of the present disclosure provides a base station, including: a transmitter and a receiver. The transmitter is configured to perform the sending step performed by the base station according to any one of the third aspect to the fifth possible implementation of the third aspect of the embodiments of the present disclosure. The receiver is configured to perform the receiving step performed by the base station according to any one of the third aspect to the fifth possible implementation of the third aspect of the embodiments of the present disclosure.

According to the technical solutions provided in the embodiments of the present disclosure, by performing precoding on the sounding reference signal sent by the user equipment, a beam of the sounding reference signal in a radio space can be targeted at the base station as accurately as possible, so that it would be easier for the base station to accurately receive the sounding reference signal.

DETAILED DESCRIPTION OF ILLUSTRATIVE EMBODIMENTS

Figure 1:
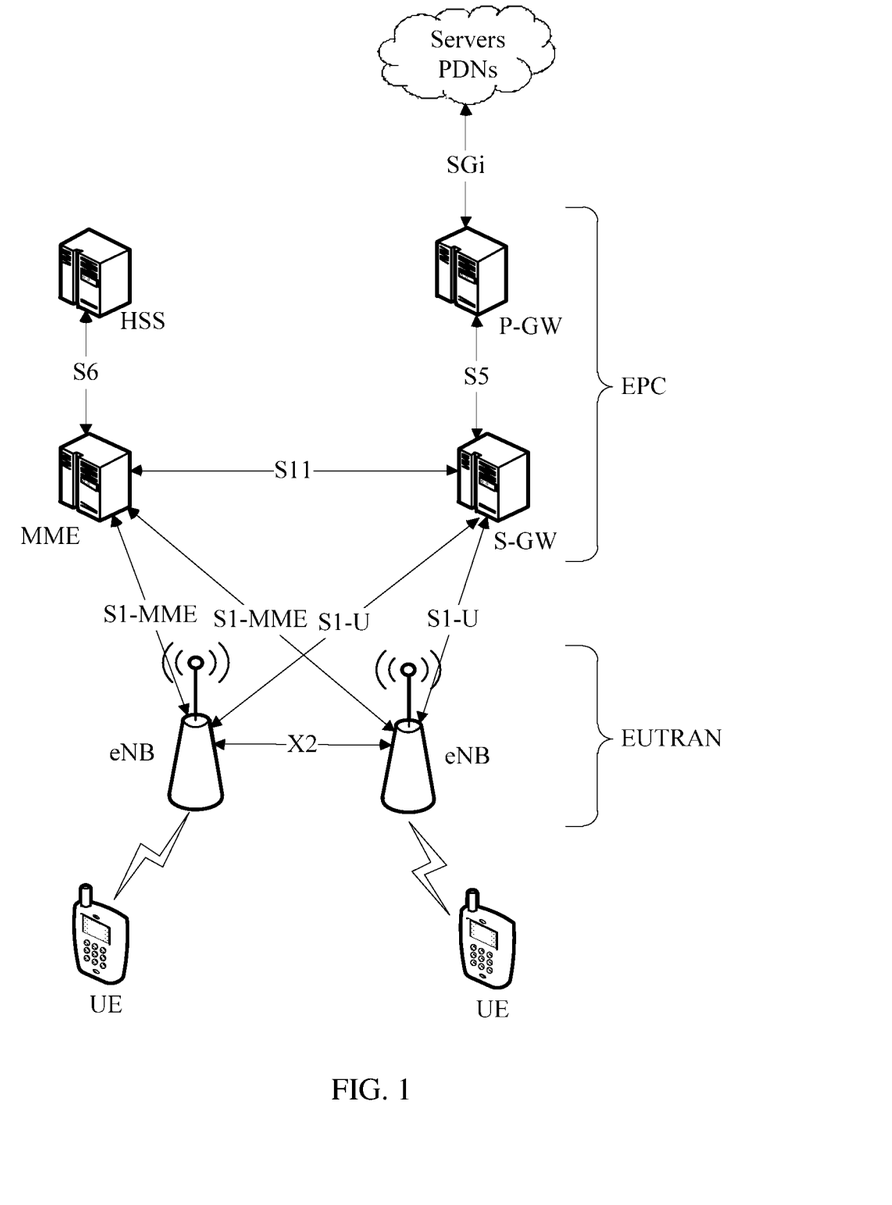
FIG. 1 is a schematic architectural diagram of a system according to one aspect of the embodiments of the present disclosure.

FIG. 1 is a schematic diagram of an architecture of an LTE system defined by the 3rd Generation Partnership Project (3GPP) specification.

The network architecture of the LTE system includes a plurality of network elements. The network elements include an evolved universal terrestrial radio access network (E-UTRAN) and an evolved packet-switched core (EPC) network. The E-UTRAN includes at least one base station, for example, an evolved NodeB (eNB). The at least one base station provides a network accessing service for UE, and may perform mutual communication through an X2 interface after an X2 interface connection is established. Network elements of the EPC network include a mobility management entity (MME), a serving gateway (S-GW), a packet data gateway (P-GW), a home subscriber server (HSS), and the like. Systems including the E-UTRAN, the EPC network and the UE served by these elements may be collectively referred to as an evolved packet system (EPS).

The MME is a control node processing signaling interaction between the UE and the EPC network. Main functions of the MME include non-access stratum (NAS) signaling establishment, NAS signaling security, cross-core network signaling establishment, tracing (trace) service, roaming service, authorization and bearer management, and the like The HSS includes a home location register (HLR). The HLR includes account information of the UE, for example, quality of service (QoS) configuration information of the EPS and access limitation of user roaming.

The S-GW is a control node processing a user plane bearer between the UE to the EPC network. The S-GW is a gateway during eNB handover and a gateway for forwarding 2G/3G and other system services, and implements downlink packet buffering, initialization, specified interception, packet routing and forwarding, and the like.

The P-GW is responsible for allocation of an Internet Protocol (IP) address of the UE, QoS ensuring, and service traffic-based accounting.

Service data of the UE is transmitted to the P-GW through the S-GW, and is then transmitted from the P-GW to various access point name (APN) nodes such as public data networks (PDN) of various services, and is connected to the Internet by using the APN nodes.

Interfaces among the network elements may be shown in FIG. 1. For definitions of the interfaces, refer to the 3GPP standard.

Various information between the UE and the base station is transmitted based on protocol layers specified in the 3GPP standard. The protocol layers mainly include a physical layer, a Media Access Control (MAC) layer, a Radio Resource Control (RRC) layer, and the like. Information transmitted on any layer is ultimately mapped to the physical layer to be transmitted in a radio space. To implement transmission on the physical layer, a radio frame is defined in a time domain and a subcarrier is defined in a frequency domain. One radio frame has a length of 10 ms and includes 10 subframes of 1 ms. One subframe includes several OFDM symbols. One subcarrier is 15 kHz, and different system bandwidths can be implemented by setting different quantities of subcarriers. In an uplink channel, the physical layer includes a physical uplink shared channel (PUSCH), a physical uplink control channel (PUCCH), a physical random access channel (PRACH), and the like. In a downlink channel, the physical layer is divided into a physical downlink shared channel (PDSCH), a physical downlink control channel (PDCCH), a physical broadcast channel (PBCH), a physical multicast channel (PMCH), a physical control format indicator channel (PCFICH), a (PHICH), and the like.

In the foregoing network architecture of the LTE system, on the uplink channel from the UE to the base station, the UE sends an SRS and uplink service data to the base station by using the SC-FDMA technology in a time division multiplexing (TDM) manner. The base station may evaluate uplink channel quality of the uplink channel on different time-frequency resources based on the SRS received from the UE, and further allocate a time-frequency resource having good uplink channel quality to the UE to transmit the uplink service data. When the UE sends the SRS at a relatively high frequency, based on a wave theory of electromagnetic waves, a diffraction capability of the electromagnetic waves is reduced. Consequently, coverage of the SRS sent by the UE is reduced, and the base station cannot easily receive the SRS from the UE.

Figure 2:
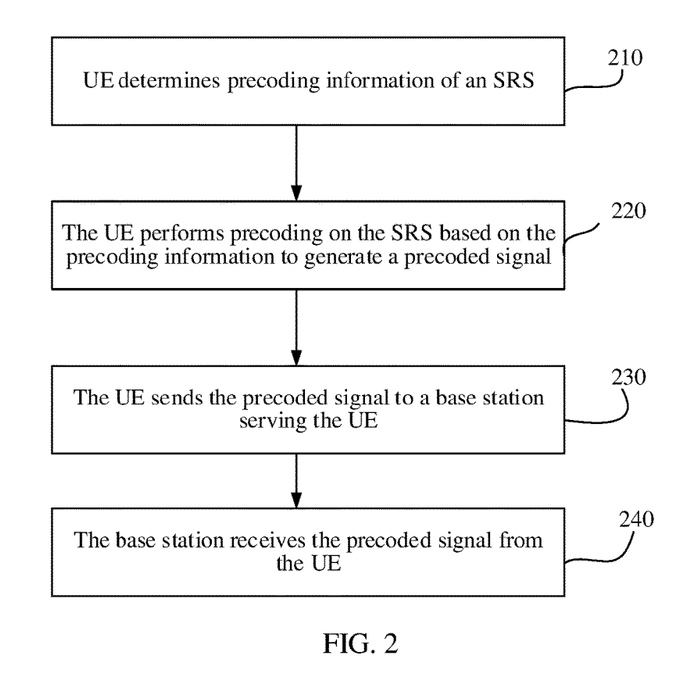
FIG. 2 is a schematic flowchart of a signal transmission method according to one aspect of the embodiments of the present disclosure.

In view of the foregoing problem, FIG. 2 is a schematic flowchart of the signal transmission method, and a signal transmission method is provided according to one aspect of the embodiments of the present disclosure. The method includes the following content.

210: UE determines precoding information of an SRS.

220: The UE performs precoding on the SRS based on the precoding information to generate a precoded signal.

230: The UE sends the precoded signal to a base station serving the UE.

240: The base station receives the precoded signal from the UE.

The term SRS used in the embodiments of the present disclosure refers to an SRS before precoding is performed, and an SRS after precoding is performed is referred to as a precoded signal. The precoding information may essentially be considered as performing amplitude adjustment and phase adjustment that match a channel on a signal, so that a beam of the signal transmitted on the channel is relatively strong in some transmission directions and relatively weak in other transmission directions. The precoding information of the SRS in the embodiments of the present disclosure is used to generate the precoded signal. The precoded signal can obtain best channel transmission quality as much as possible on an uplink channel between the UE and the base station because signal amplitude adjustment and signal phase adjustment have been performed on the precoded signal. A definition of best channel transmission quality may vary in different communications systems. The best channel transmission quality herein may be that energy loss, a signal-to-noise ratio, a signal power, or an error ratio after the uplink transmission is performed on the precoded signal satisfies a requirement set by the communications system. For the UE, by performing amplitude adjustment and phase adjustment by using the precoding information, a beam of the SRS during transmission in a radio space can be targeted at the base station as accurately as possible, so that it would be easier for the base station to accurately receive the SRS. From the perspective of the base station, because it is easier for the base station to accurately receive the SRS, difficulty in internal processing of the base station when the base station attempts to restore the SRS can be reduced. For example, requirements on a processing speed, a processing algorithm, and the like of a processor in the base station are lowered.

In 210, the precoding information of the SRS may be determined and sent to the UE by the base station, or may be determined by the UE.

In an implementation, in 210, that the UE determines the precoding information of the SRS may include: receiving, by the UE, first information sent by the base station, where the first information is used by the UE to determine the precoding information; and determining, by the UE, the precoding information based on the first information.

The first information may be the precoding information of the SRS. In this case, the base station determines the precoding information of the SRS and sends the precoding information to the user equipment. The precoding information of the SRS is determined by the user equipment the minute the precoding information of the SRS is received by the user equipment.

The first information may alternatively be uplink channel information. In this case, the uplink channel information may be determined and sent to the user equipment by the base station. The user equipment determines the precoding information of the SRS based on the received uplink channel information. The uplink channel information may be a measurement result after the base station measures an uplink channel, or may be uplink channel quality determined by the base station based on the measurement result. The uplink channel quality may be represented by using a channel quality indicator (CQI). In a time division duplex (TDD) system, there is reciprocity between an uplink channel and a downlink channel. The base station may determine quality of the uplink channel based on quality of the downlink channel reported by the UE, or may directly measure an uplink signal sent by the UE. The uplink signal may be an SRS, a demodulation reference signal (DMRS) or uplink service data. The uplink channel information may be used to determine a channel transmission matrix of the uplink channel. The channel transmission matrix is physical quantities representing inherent features of a channel. Such inherent features of a channel may deform a signal transmitted on a channel, for example, produce effects, such as amplification or attenuation, a Doppler frequency shift, phase rotation, multipath delay, of the transmitted signal.

For example, before the user equipment performs precoding on the SRS, the base station may receive the SRS sent by the user equipment and measure the uplink channel based on the SRS. The base station may be unable to accurately receive the SRS sent by the UE before precoding is performed on the SRS. To overcome this problem, the UE may send the SRS (that is, the SRS before precoding is performed) at a transmit power higher than a threshold, or within a preset time length, the base station uses a plurality of received SRS signals (whether accurately received or not) as parameter samples, uses an SRS obtained by using a parameter estimation algorithm as an accurately received SRS, and determines a measurement result of the uplink channel by using this SRS, so as to determine the uplink channel information. Commonly used parameter estimation algorithms include maximum likelihood estimation (MLE), least square estimation (LSE), moment estimation (ME), and the like. It should be noted that, to improve efficiency of receiving, by the base station, the SRS, a sending time of the SRS and a sending time of the precoded signal (the SRS after precoding is performed) may be coordinated between the base station and the UE. For example, the UE determines the sending time of the SRS and informs the base station of the sending time. Alternatively, the base station determines the sending time of the SRS and informs the UE of the sending time. Therefore, the signal transmission method provided in the embodiments of the present disclosure may further include: determining, by the UE, a sending time of the precoded signal, and informing the base station of the sending time of the precoded signal. The sending time of the precoded signal may alternatively be determined by the base station, and then second information is sent by the base station to the UE, where the second information indicates the sending time of the precoded signal. It should be noted that, the sending time of the precoded signal may be periodical or non-periodical, and may be configured by the base station or determined by the UE. Correspondingly, the UE may send the SRS to the base station at any time other than the sending time of the precoded signal. In the LTE system, the SRS sent by the UE may be located in a last OFDM symbol of a subframe. If a physical uplink shared channel (PUSCH) for bearing service data or a physical uplink control channel (PUCCH) for bearing control signaling is further transmitted on the subframe, neither of locations of the PUSCH and the PUCCH in the subframe overlaps the location of the SRS.

The first information may alternatively be information for triggering the UE to determine the precoding information of the SRS. For example, the first information is the foregoing precoding information or uplink channel information. Alternatively, the first information may be an identifier. After being received by the UE, the identifier triggers the UE to determine the precoding information of the SRS.

It should be noted that, the base station may add the first information to downlink control information (DCI) of a physical downlink control channel (or an enhanced physical downlink control channel). Before accessing the base station, the UE obtains the downlink control information by performing blind detection. For details of blind detection and definitions of a transmission format of the downlink control information, refer to the prior art. If the UE already accesses the base station, the base station may add the first information to the downlink control information, or may send the first information to the UE by using an RRC message on an established Radio Resource Control (RRC) connection, or may add the first information to a control element (CE) of a medium access control (MAC) layer.

In another implementation, in 210, that the UE determines the precoding information of the SRS may include: after the UE sends the SRS to the base station, the base station fails to determine, based on the SRS, a time-frequency resource used by the UE to transmit uplink service data, or for a time-frequency resource used by the UE to transmit uplink service data, the base station cannot ensure QoS of the uplink service data. In this case, the UE determines that the base station cannot determine the uplink channel quality based on the received SRS, so that the UE determines the precoding information of the SRS, performs precoding on the SRS, and then sends the precoded signal to the base station.

Methods of determining the precoding information mainly include a method based on codebook space design and a method based on non-codebook space design. The precoding information may be expressed in a form of a matrix. Correspondingly, the precoding information is a precoding matrix or a precoding matrix indicator (PMI) used for identifying a precoding matrix.

In the method of determining the precoding information based on codebook space design, one codebook space is a set including at least one precoding matrix. One channel may correspond to at least one precoding matrix. When precoding is performed, by using the at least one precoding matrix corresponding to this channel, on a signal transmitted on the channel, the signal transmitted on the channel may obtain best channel transmission quality. During engineering practice, different channels may be traversed to obtain different precoding matrices, thereby obtaining codebook spaces corresponding to the different channels. Codebook spaces may be prestored in the UE and the base station before the UE and the base station perform communication. If a precoding matrix is determined by the base station, the base station may send a determined precoding matrix indicator (PMI) to the UE instead of feeding back the entire precoding matrix. If a precoding matrix is determined by the UE, the UE sends a PMI to the base station. In the method of determining the precoding information based on codebook space design, when a multiple-antenna technology is used, to further reduce interference among different antenna ports, the UE and the base station may further exchange a rank indicator (RI) and an antenna port. The RI represents a quantity of linearly independent vector groups of an uplink channel transmission matrix.

In the method of determining the precoding information based on non-codebook space design, the UE may establish a channel transmission matrix based on a measurement result of an uplink channel received from the base station and perform matrix factorization on the channel transmission matrix. For example, a commonly used processing method is after performing singular value decomposition (SVD) on the channel transmission matrix, using an obtained unitary matrix as a precoding matrix, and then informing the base station of the precoding matrix, so that the base station decodes the precoded signal by the UE based on the precoding matrix sent. Certainly, the base station may alternatively establish a channel transmission matrix based on a measurement result of an uplink channel, perform matrix factorization, and then inform the UE of the factorized precoding matrix. In the method of determining the precoding information based on non-codebook space design, because the precoding matrix is not selected from a codebook space but is determined based on a real-time measurement result of the uplink channel during communication between the UE and the base station, an obtained measurement result of the uplink channel is more accurate compared with the measurement result obtained by prestoring codebook spaces in the UE and the base station.

The foregoing possible implementations of determining the precoding information may be applied to a wireless communications system using a frequency division duplex (FDD) mode or a time division duplex (TDD) mode.

In addition, for the TDD mode in particular, because an uplink channel and a downlink channel use a same communication frequency, the uplink channel and the downlink channel may be considered to be approximately the same. Therefore, in a process of determining the precoding information, the UE may, when a reference signal received power (RSRP) of the downlink channel, a path loss of the downlink channel, or a CQI does not satisfy a preset condition, determine the precoding information of the SRS. After the UE is triggered to determine the precoding information of the SRS, the UE may determine the precoding information of the SRS based on a downlink reference signal, such as a channel state information reference signal (CSI-RS), a cell-specific reference signal (CRS), or a user equipment-specific reference signal (UE-specific reference signal), sent by the base station on the downlink channel. The UE may decode, by using a downlink reference signal known to the UE, the reference signal sent by the base station and transmitted by using the downlink channel, to obtain downlink channel information and determine a downlink channel transmission matrix. Because an uplink channel is approximately the same as a downlink channel in the TDD mode, the UE may consider the downlink channel transmission matrix as an uplink channel transmission matrix, thereby determining the precoding information of the SRS based on the downlink channel transmission matrix. Optionally, in the TDD mode, the base station may alternatively determine quality of the uplink channel based on downlink channel quality reported by the UE, or directly measure an uplink signal, such as an SRS, a demodulation reference signal (DMRS), or uplink service data, sent by the UE. Likewise, in the TDD mode, the base station may determine precoding information of the downlink reference signal based on the SRS or the precoded signal (the SRS after precoding is performed), thereby determining the downlink channel quality.

In 210, the precoding information of the SRS may alternatively be preconfigured and stored in the UE and the base station. In this case, the base station may receive the precoded signal from the UE and process the precoded signal according to the preconfigured precoding information, thereby restoring the SRS.

In 210, if before sending the precoded signal, the UE performs precoding on service data born on a PUSCH, the UE may alternatively use precoding information used by the PUSCH to bear service data one or more times recently as the precoding information of the SRS.

In an implementation, in 220, the UE determines the precoding information of the SRS, thereby obtaining a precoding matrix used for performing precoding. By performing a multiplication operation on the precoding matrix and the SRS, the UE may obtain a signal after precoding is performed on the SRS, that is, the foregoing precoded signal. The precoded signal is transmitted on the uplink channel. Because compared with the SRS on which precoding is not performed, a beam of the precoded signal is less interfered, and the beam is targeted at the base station as accurately as possible. Therefore, the base station may accurately receive the precoded signal and obtained the SRS by performing decoding, thereby determining the uplink channel quality base on the SRS.

Figure 3A:
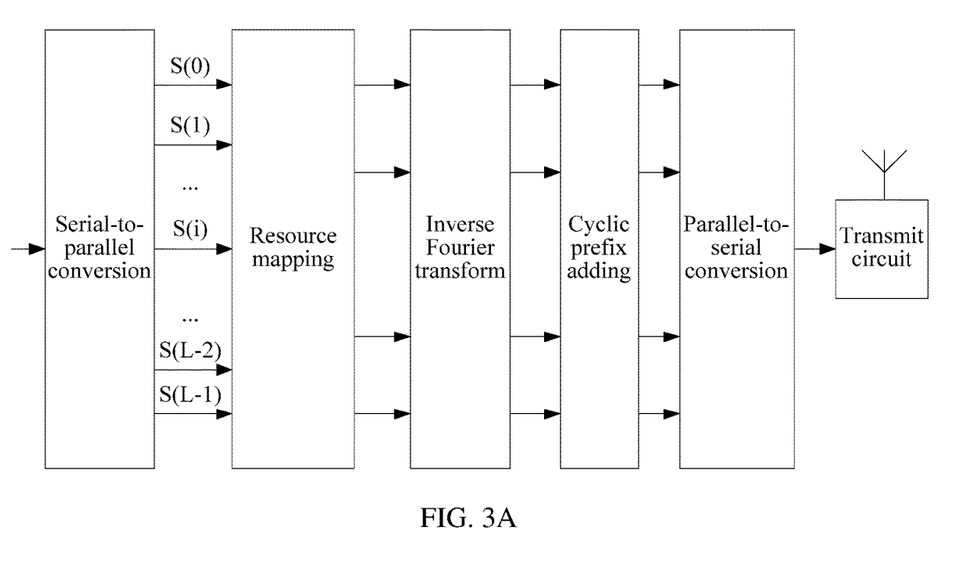
FIG. 3A is a schematic diagram of a precoded signal sending process according to one aspect of the embodiments of the present disclosure.

In an implementation, in 230, the UE sends the precoded signal in a radio space to the base station. A sending process of the precoded signal is shown in FIG. 3A. The process includes a serial-to-parallel conversion process, a resource mapping process, an inverse discrete Fourier transform process, a cyclic prefix adding process, a parallel-to-serial conversion process, and an antenna transmission process.

The precoded signal, $[S(0) \ldots, S(i), \ldots, S(L-1)]$ (where $S(i)$ is a sequence element included in the precoded signal, a value of i is a positive integer ranging from 0 to L−1, and L is a total quantity of sequence elements included in the precoded signal), is converted from serial sequence elements to parallel sequence elements by performing the serial-to-parallel conversion process, the parallel sequence elements of the precoded signal are mapped to different subcarriers by performing a subcarrier mapping process, and orthogonality is generated between the parallel sequence elements by performing inverse Fourier transform. To avoid interference among symbols, the cyclic prefix adding process is performed to add cyclic prefixes to the parallel sequence elements, then the parallel-to-serial conversion process is performed to convert the parallel sequence elements to serial sequence elements, and the serial sequence elements are transmitted by using an antenna.

Figure 3B:
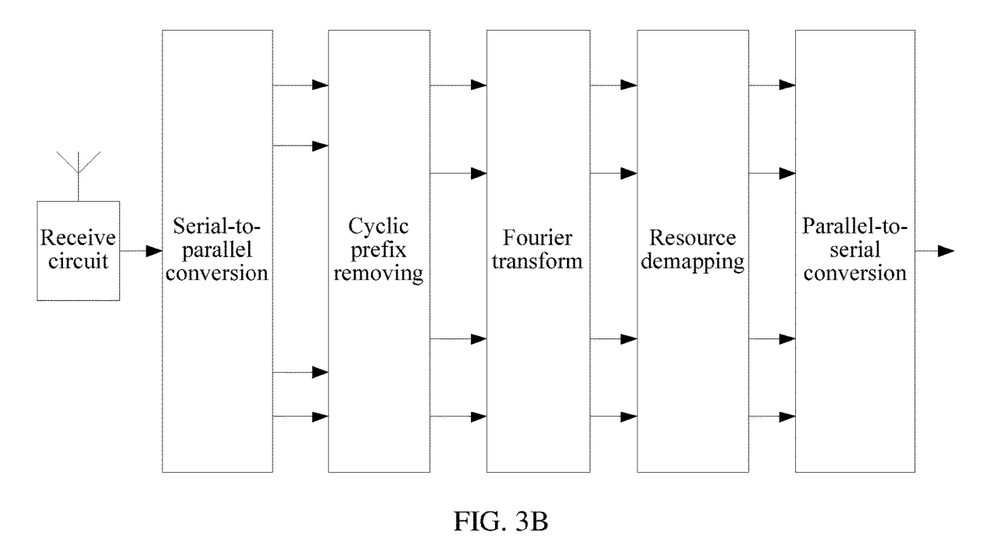
FIG. 3B is a schematic diagram of a precoded signal receiving process according to one aspect of the embodiments of the present disclosure.

In an implementation, in 240, the base station receives, in a radio space, the precoded signal sent by the UE. A process of receiving the precoded signal by the base station is shown in FIG. 3B. The process includes: an antenna receiving process, a serial-to-parallel conversion process, a cyclic prefix removing process, a Fourier transform process, a resource demapping process, and a parallel-to-serial conversion process. This process and the process of sending the precoded signal by the UE are substantially in a mutually inverse relationship, and details are not described herein again.

It should be noted that, the implementations in 230 and 240 are merely possible implementations that enable a person skilled in the art to generally understand the embodiments of the present disclosure. However, the implementations in 230 and 240 are not unique. For other possible implementations, refer to the prior art.

Optionally, the base station may further instruct the UE to traverse different times to use different precoding matrices to send precoded signals. In this way, the base station may feed quality of the precoded signals received at different times back to the UE, and the UE may adjust a precoding matrix used to send a next precoded signal, thereby implementing higher quality transmission of precoded signals.

The embodiments of the present disclosure may be applied to a carrier aggregation (CA) scenario. In brief, the carrier aggregation means that UE and a base station perform communication by using at least two frequency bands. If there is currently one base station serving the UE, that the base station and the UE perform communication by using at least two frequency bands may be referred to as intra-base station carrier aggregation. If there are currently at least two base stations serving the UE, a communication manner among these base stations and the UE may be referred to as inter-base station carrier aggregation. For example, in networking of a macro base station and a small-cell base station, frequencies between the macro base station and the UE are mainly used to transmit control signaling, and frequencies between the small-cell base station and the UE are mainly used to transmit service data. By using carrier aggregation, a plurality of frequency bands are combined, equivalent to increasing system bandwidths used by the UE for communication, thereby improving system throughput.

Figure 4:
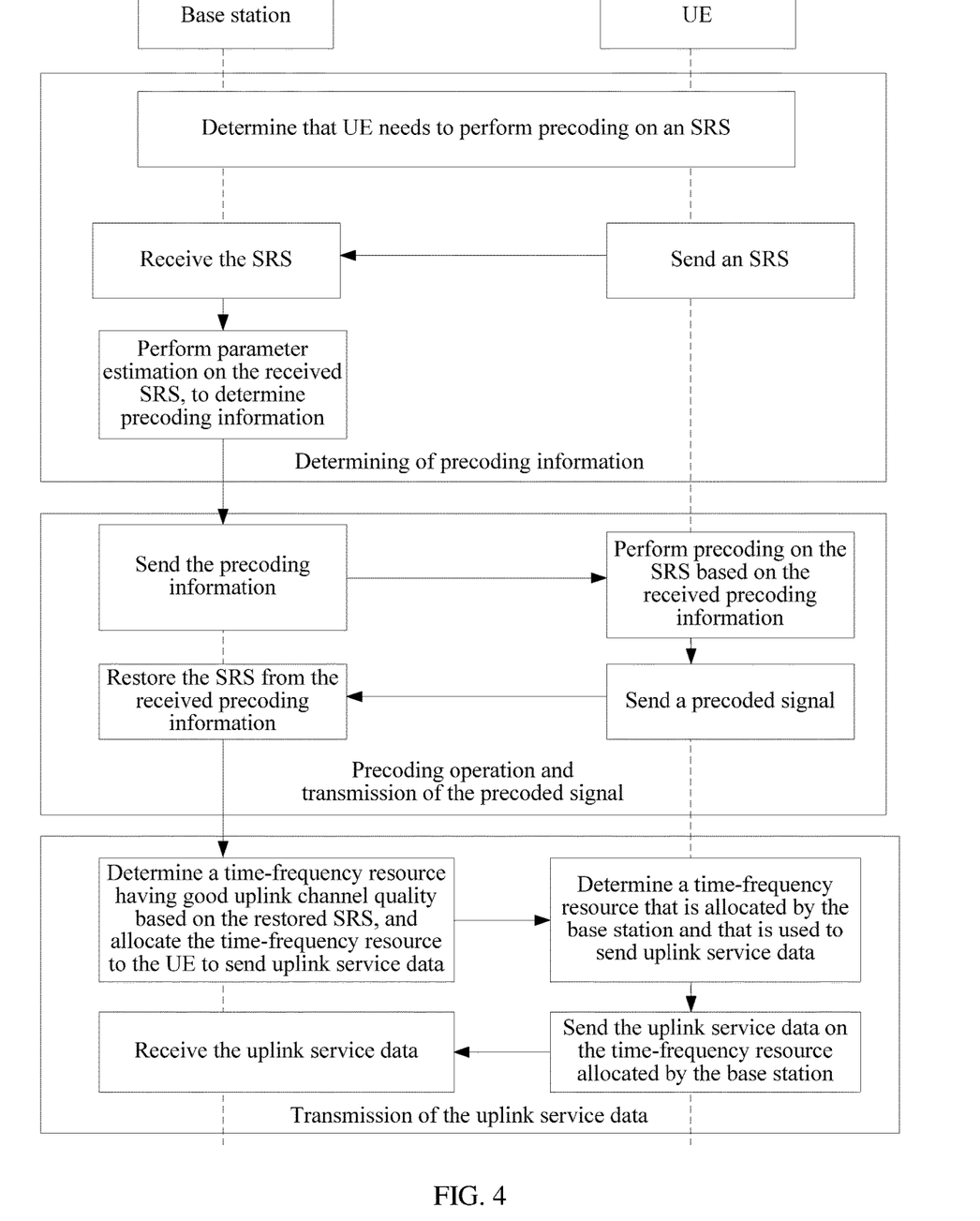
FIG. 4 is a schematic diagram of system interaction of a signal transmission method according to one aspect of the embodiments of the present disclosure.

In conclusion, an example of the signal transmission method provided in the embodiments of the present disclosure is shown in FIG. 4. The example mainly includes the process of determining the precoding information by the base station and the UE, the precoding operation and the transmission process of the precoded signal, and further includes the transmission process of the uplink service data.

According to the technical solutions provided in the embodiments of the present disclosure, the UE generates the precoded signal by performing precoding on the SRS and sends the precoded signal to the base station. In this way, a beam of the precoded SRS in a radio space may be targeted at the base station as accurately as possible, so that it would be easier for the base station to accurately receive the SRS.

Figure 5:
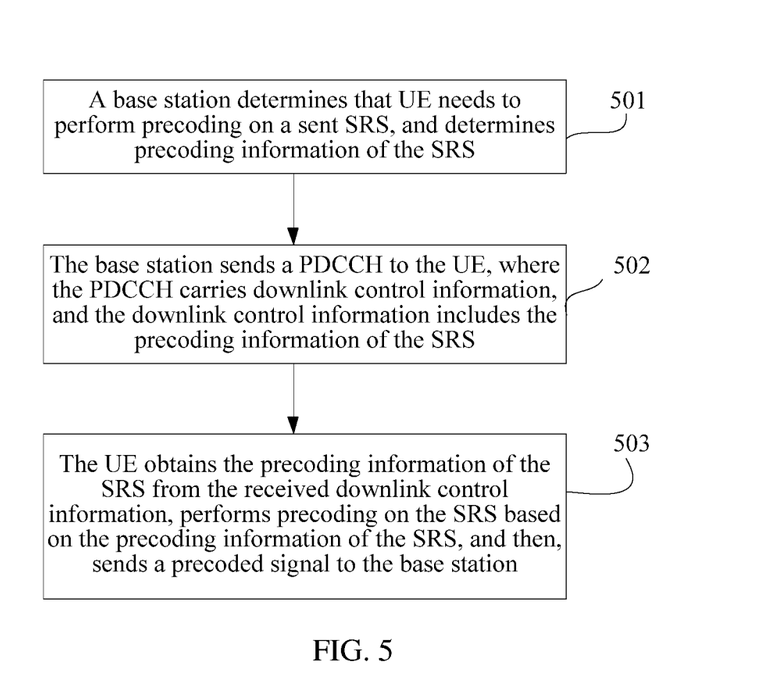
FIG. 5 is a schematic flowchart of a signal transmission method according to another aspect of the embodiments of the present disclosure.
Figure 6:
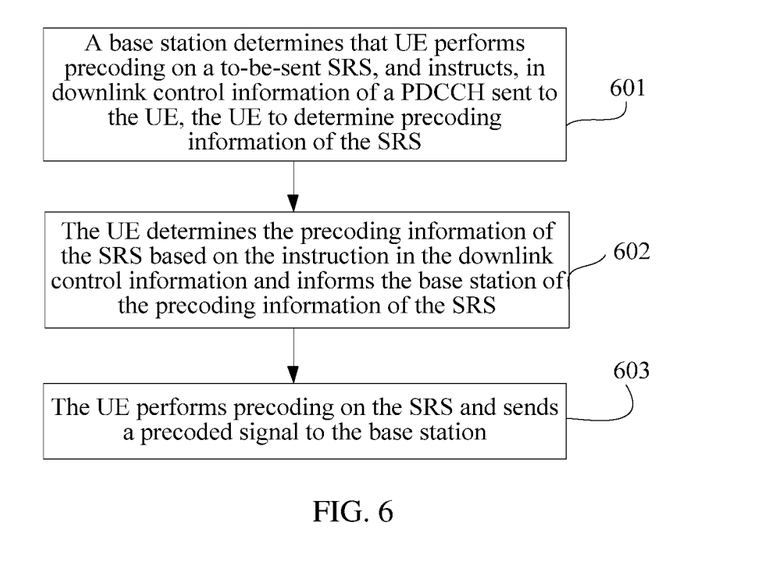
FIG. 6 is a schematic flowchart of a signal transmission method according to another aspect of the embodiments of the present disclosure.
Figure 7:
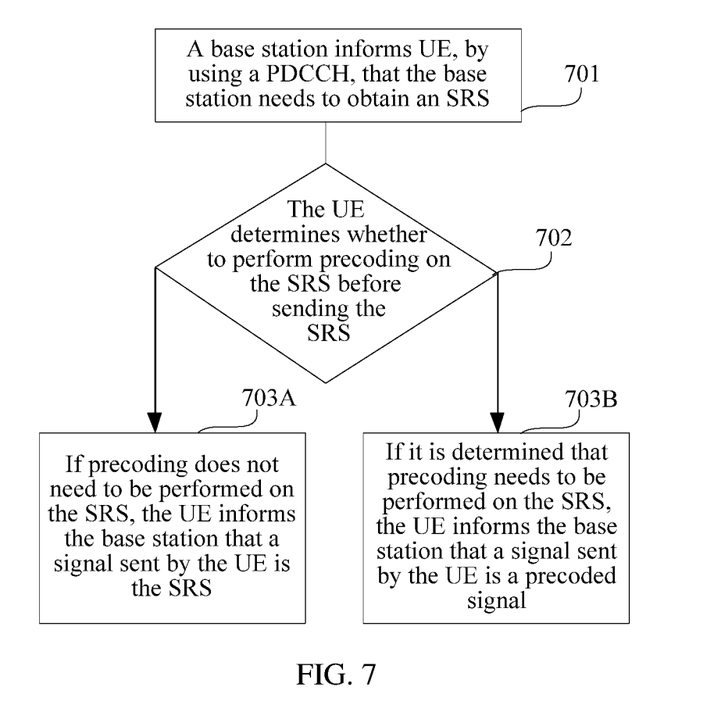
FIG. 7 is a schematic flowchart of a signal transmission method according to another aspect of the embodiments of the present disclosure.

Another aspect of the embodiments of the present disclosure provides a plurality of implementations of a signal transmission method, as shown in FIG. 5 to FIG. 7. These implementations are further details or supplements of the foregoing method embodiment and underline an interaction process between UE and a base station. For another same or similar process, details are unlikely to be described herein again.

In an implementation shown in FIG. 5, the base station directly determines precoding information of an SRS, and informs the UE of the precoding information by using a PDCCH. The implementation shown in FIG. 5 includes the following content.

501: The base station determines that the UE needs to perform precoding on a sent SRS, and determines precoding information of the SRS.

502: The base station sends a PDCCH to the UE, where the PDCCH carries downlink control information, and the downlink control information includes the precoding information of the SRS.

503: The UE obtains the precoding information of the SRS from the received downlink control information, performs precoding on the SRS based on the precoding information of the SRS, and then, sends a precoded signal to the base station.

In an implementation shown in FIG. 6, the base station instructs the UE to determine the precoding information of the SRS. That is, the base station does not directly determine the precoding information of the SRS. Instead, the UE determines the precoding information of the SRS and then informs the base station of the precoding information. The implementation shown in FIG. 6 includes the following content.

601: The base station determines that the UE performs precoding on a to-be-sent SRS, and instructs, in downlink control information of a PDCCH sent to the UE, the UE to determine the precoding information of the SRS. The base station does not directly determine the precoded signal of the SRS.

602: The UE determines the precoding information of the SRS based on the instruction in the downlink control information and informs the base station of the precoding information of the SRS.

603: The UE performs precoding on the SRS and sends a precoded signal to the base station.

In an implementation shown in FIG. 7, the base station informs the UE that an SRS needs to be obtained, the UE determines whether to perform precoding on an SRS before sending the SRS, and informs the base station that the signal sent by the UE is a precoded signal if determining that precoding needs to be performed. The implementation shown in FIG. 7 includes the following content.

701: The base station informs the UE, by using a PDCCH, that the base station needs to obtain an SRS.

702: The UE determines whether to perform precoding on the SRS before sending the SRS.

703A: If precoding does not need to be performed on the SRS, the UE informs the base station that a signal sent by the UE is the SRS.

703B: If it is determined that precoding needs to be performed on the SRS, the UE informs the base station that a signal sent by the UE is a precoded signal.

In the implementations shown in FIG. 5 to FIG. 7, the base station may further inform the UE of a sending time of a precoded signal after determining the sending time, so that the UE may send the precoded signal based on the sending time. Alternatively, the UE may inform the base station of a sending time of a precoded signal after determining the sending time, so that the base station may receive the precoded signal based on the sending time. Because an uplink channel may vary with time, corresponding precoding information may change. Therefore, precoded signals sent by the UE at respective sending times may be different.

The base station may inform the UE of a plurality of pieces of precoding information that are within a preset time period, and after performing precoding on the SRS by respectively using the plurality of pieces of precoding information within the preset time period, the UE sends a plurality of generated precoded signals. For example, the base station informs the UE that a plurality of pieces of precoding information used within each time period is PMI 1, PMI 2, . . . , and PMI n (where n is any positive integer). After performing precoding on the SRS based on precoding matrices corresponding to the plurality of pieces of precoding information, the UE sends a plurality of generated precoded signals in each time period.

In the implementations shown in FIG. 5 to FIG. 7, the base station may further inform the UE of a sending time of an SRS after determining the sending time of the SRS. The sending time of the SRS may be periodical. In this case, the sending time of the precoded signal does not overlap the sending time of the SRS. For example, the sending time of the precoded signal is between periodical sending times of two SRSs. As described in the foregoing method embodiment, the base station may determine the precoding information of the SRS based on parameter estimation performed on the SRS, to generate a precoded signal.

When the implementations shown in FIG. 5 to FIG. 7 are applied to the TDD mode, the precoding information of the SRS may be used as precoding information of a downlink reference signal (for example, a CSI-RS), so that precoding may be performed on the downlink reference signal, to evaluate downlink channel quality.

In the implementations shown in FIG. 5 to FIG. 7, before the UE performs precoding on the SRS by using the precoding information of the SRS, the base station may further indicate a mathematical sequence, such as a constant amplitude zero auto correlation (CACAZ) sequence, used by the UE to generate the SRS. Before the UE performs precoding on the SRS by using the precoding information of the SRS, the base station may further instruct the UE to use a data sequence having a same frequency as that of a data sequence used by another UE served by a neighboring base station. Alternatively, the base station instructs the UE to perform scrambling on the SRS by using a virtual cell identity in coordinated multipoint (CoMP). In this way, both the base station and the neighboring base station can obtain an SRS from the precoded signal sent by the UE, so as to further determine uplink channel quality. In addition, downlink channel quality may be further determined in the TDD mode. The base station and the neighboring base station may exchange, by using an X2 interface, the SRSs respectively obtained by the base station and the neighboring base station, so as to perform downlink coordinated scheduling or coordinated beamforming (CS/CB) or joint transmission (JT). CS/CB refers to that base stations participate in the CoMP (the base station and the neighboring base station described above) coordinate to perform resource scheduling or beamforming on the UE. Specifically, the base station and the neighboring base station exchange resource scheduling information or the precoding information of the SRSs. A PDCCH and a PDSCH are still sent to the UE by using a serving cell of the base station. JT refers to that when the UE is located at an edge of a cell, a serving cell of the base station and a cell of the neighboring base station send same service data to the UE on a same time-frequency resource, so that a signal is strengthened when the UE is located at the edge of the cell.

It should be noted that, in the implementations shown in FIG. 5 to FIG. 7, the determining the precoding information of the SRS between the base station and the UE is not described in detail. For details, refer to 210 of the embodiment shown in FIG. 2.

According to the technical solution provided in another aspect of the embodiments of the present disclosure, the UE generates the precoded signal by performing precoding on the SRS and sends the precoded signal to the base station. In this way, a beam of the precoded SRS in a radio space may be targeted at the base station as accurately as possible, so that it would be easier for the base station to accurately receive the SRS.

Figure 8:
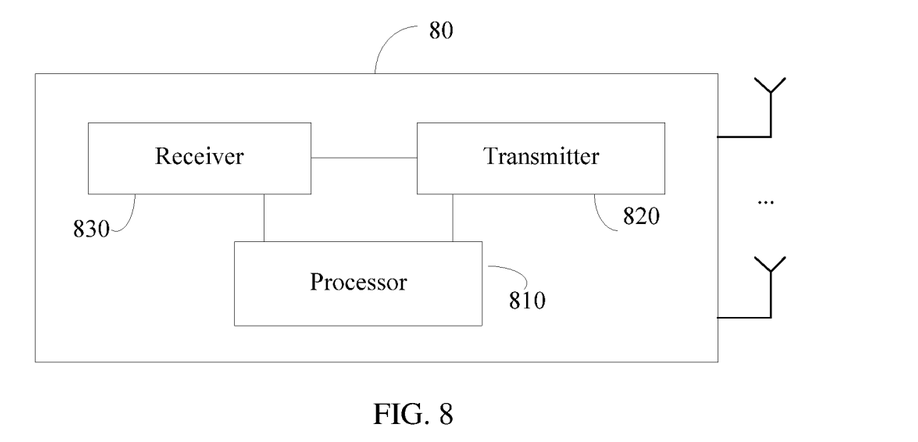
FIG. 8 is a schematic structural diagram of user equipment according to one aspect of the embodiments of the present disclosure.

Still another aspect of the embodiments of the present disclosure provides user equipment 80. As shown in FIG. 8, the user equipment 80 includes a processor 810 and a transmitter 820. The processor 810 is configured to determine precoding information of a sounding reference signal and perform precoding on the sounding reference signal based on the precoding information to generate a precoded signal. The transmitter 820 is configured to send the precoded signal to a base station serving the user equipment.

The first information is the precoding information, uplink channel information, or information for triggering the user equipment to determine the precoding information of the sounding reference signal.

Optionally, the user equipment 80 further includes a receiver 830, configured to receive first information sent by the base station, where the first information is used by the processor to determine the precoding information.

Optionally, the transmitter 820 is further configured to: before the receiver 830 receives the first information sent by the base station, send downlink channel quality information to the base station, where the downlink control channel quality information is used by the base station to determine that the user equipment performs precoding on the sounding reference signal.

Optionally, the processor 810 is further configured to: before determining the precoding information, determine, based on the downlink channel quality information, that precoding needs to be performed on the sounding reference signal.

Optionally, the processor 810 is further configured to determine a sending time of the precoded signal.

Optionally, that the processor 810 is configured to determine a sending time of the precoded signal includes:

the processor 810 is configured to determine, based on second information received by the user equipment from the base station, the sending time of the precoded signal, where the second information indicates the sending time of the precoded signal.

Optionally, the transmitter 820 is further configured to inform the base station of the sending time of the precoded signal.

Optionally, the transmitter 820 is further configured to send the sounding reference signal to the base station at a time other than the sending time of the precoded signal, where the sounding reference signal is used by the base station to determine the uplink channel information. It should be noted that, the receiver, the processor, and the transmitter of the user equipment 80 may implement the receiving, determining and sending steps performed by the user equipment in the implementations shown in FIG. 2 to FIG. 7. For details, refer to the foregoing method embodiment, and same concepts and processes are not described again. Corresponding component units in the transmitter may be implemented by the transmitter of the user equipment 80 according to the logical procedures shown in FIG. 3A, so that various signals, such as the foregoing SRS and precoded signal, may be sent in a radio space to the base station. Corresponding component units in the receiver may be implemented by the receiver of the user equipment 80 according to the logical procedures shown in FIG. 3B, so that various signals, such as the first information and the second information sent by the base station, may be received in a radio space from the base station.

Figure 9:
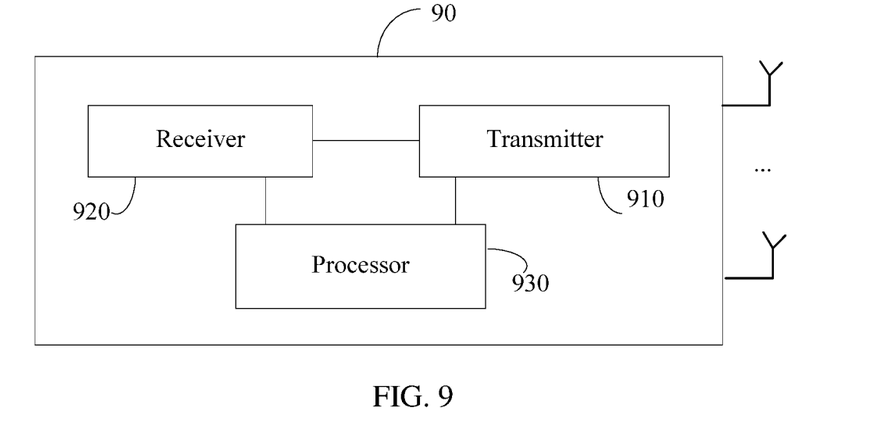
FIG. 9 is a schematic structural diagram of a base station according to one aspect of the embodiments of the present disclosure.

Still another aspect of the embodiments of the present disclosure provides a base station 90. As shown in FIG. 9, the base station 90 includes: a transmitter 910, a receiver 920, and a processor 930. The transmitter 910 and the receiver 920 are coupled by using the processor 930. The transmitter 910 is configured to send first information to user equipment served by the base station, where the first information is used by the user equipment to determine precoding information of a sounding reference signal. The receiver 920 is configured to receive a precoded signal from the user equipment, where the precoded signal is generated by the user equipment by performing, based on the precoding information, precoding on the sounding reference signal.

The first information is the precoding information, uplink channel information, or information for triggering the user equipment to determine the precoding information of the sounding reference signal.

Optionally, the transmitter 910 is further configured to send second information to the user equipment, where the second information indicates a sending time of the precoded signal.

Optionally, the receiver 920 is further configured to receive a notification from the user equipment, where the notification indicates the sending time of the precoded signal.

Optionally, the receiver 920 is further configured to receive the sounding reference signal from the user equipment at a time other than the sending time of the precoded signal, where the sounding reference signal is used by the base station to determine the uplink channel information.

Optionally, the receiver 920 is further configured to before the transmitter sends the first information to the user equipment, receive downlink channel quality information sent by the user equipment, where the downlink channel quality information is used to determine that the user equipment performs precoding on the sounding reference information.

It should be noted that, the receiver 920, the processor 930, and the transmitter 910 of the base station 90 may implement the receiving, determining and sending steps performed by the base station in the implementations shown in FIG. 2 to FIG. 7. For details, refer to the foregoing method embodiment, and same concepts and processes are not described again. Corresponding component units in the transmitter may be implemented by the transmitter of the base station 90 according to the logical procedures shown in FIG. 3A, so that various signals, such as the foregoing first information and second information, may be sent in a radio space to the user equipment. Corresponding component units in the receiver may be implemented by the receiver of the base station 90 according to the logical procedures shown in FIG. 3B, so that various signals, such as the SRS and the precoded signal, sent by the user equipment may be received in a radio space from the user equipment.

To implement communication between the user equipment 80 and the base station 90, each of the user equipment 80 and the base station 90 may include at least one physical antenna. A quantity of physical antennas in the user equipment 80 may be the same as or different from a quantity of physical antennas in the base station 90. For specific antenna configuration, refer to existing 3GPP protocols. According to the user equipment 80 and the base station 90 provided in the embodiments of the present disclosure, the UE generates the precoded signal by performing precoding on the SRS and sends the precoded signal to the base station. In this way, a beam of the precoded SRS in a radio space may be targeted at the base station as accurately as possible, so that it would be easier for the base station to accurately receive the SRS.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the apparatus (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present disclosure have been described, a person skilled in the art can make changes and modifications to these embodiments once they learn the basic inventive concept. Therefore, the following claims are intended to be construed as to cover the preferred embodiments and all changes and modifications falling within the scope of the present disclosure.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A method comprising:
    receiving, by a user equipment from a base station, first information in a physical downlink control channel, wherein the first information is used for determining precoding information of a sounding reference signal (SRS);
    determining, by the user equipment, the precoding information of the SRS based on the first information;
    performing, by the user equipment based on the precoding information of the SRS, precoding on the SRS to generate a precoded SRS;
    sending, by the user equipment, the precoded SRS to the base station; and
    sending, by the user equipment, the SRS to the base station at a time other than a sending time of the precoded SRS,
    wherein the first information is based on a demodulation reference signal (DMRS) or uplink service data.

2. The method according to claim 1, wherein the first information triggers the user equipment to determine the precoding information of the SRS.

3. The method according to claim 2, wherein determining, by the user equipment, the precoding information of the SRS based on the first information comprises, when the user equipment is triggered to determine the precoding information of the SRS in a wireless communication system using a time division duplex mode, determining, by the user equipment based on a downlink reference signal from the base station, the precoding information of the SRS.

4. The method according to claim 3, wherein the downlink reference signal is a channel state information reference signal (CSI-RS).

5. The method according to claim 1, further comprising receiving, by the user equipment, second information sent by the base station, wherein the second information indicates the sending time of the precoded SRS.

6. The method according to claim 1, wherein the first information is based on the demodulation reference signal (DMRS).

7. The method according to claim 1, wherein the first information is based on the uplink service data.

8. A method comprising:
sending, by a base station to a user equipment served by the base station, first information in a physical downlink control channel, wherein the first information is used to determine precoding information of a sounding reference signal (SRS);
receiving, by the base station, a precoded SRS from the user equipment, wherein the precoded SRS is generated by precoding the SRS using the precoding information; and
receiving, by the base station, the SRS from the user equipment at a time other than a sending time of the precoded SRS,
wherein the first information is based on the SRS, a demodulation reference signal (DMRS) or uplink service data.

9. The method according to claim 8, wherein the first information triggers the user equipment to determine the precoding information of the SRS.

10. The method according to claim 9, further comprising:
sending, by the base station, a downlink reference signal in a wireless communication system using a time division duplex mode, wherein the downlink reference signal is used to determine the precoding information of the SRS, and wherein the downlink reference signal is a channel state information reference signal (CSI-RS).

11. The method according to claim 8, further comprising determining, by the base station, uplink channel information based on the SRS.

12. The method according to claim 8, further comprising sending, by the base station, second information to the user equipment, wherein the second information indicates the sending time of the precoded SRS.

13. The method according to claim 8, wherein the first information is based on the demodulation reference signal (DMRS).

14. A user equipment comprising:
a receiver;
a processor; and
a transmitter,
wherein the receiver is configured to receive first information in a physical downlink control channel from a base station, wherein the first information is used for determining precoding information of a sounding reference signal (SRS),
wherein the processor is configured to determine precoding information of SRS and perform precoding on the SRS based on the precoding information, to generate a precoded SRS,
wherein the transmitter is configured to send the precoded SRS to the base station,
wherein the transmitter is further configured to send the SRS to the base station at a time other than a sending time of the precoded SRS, and
wherein the first information is based on a demodulation reference signal (DMRS) or uplink service data.

15. The user equipment according to claim 14, wherein the first information triggers the user equipment to determine the precoding information of the SRS.

16. The user equipment according to claim 15, wherein the processor is configured to, when the user equipment is triggered to determine the precoding information of the SRS in a wireless communication system using a time division duplex mode, determine, based on a downlink reference signal from the base station, the precoding information of the SRS.

17. The user equipment according to claim 16, wherein the downlink reference signal is a channel state information reference signal (CSI-RS).

18. The user equipment according to claim 14, wherein the SRS is used by the base station to determine uplink channel information.

19. The user equipment according to claim 14, wherein the receiver is further configured to receive second information from the base station, and wherein the second information indicates the sending time of the precoded SRS.

20. A base station comprising:
a transmitter; and
a receiver;
wherein the transmitter is configured to send first information in a physical downlink control channel to a user equipment served by the base station, wherein the first information is used by the user equipment to determine precoding information of a sounding reference signal (SRS),
wherein the receiver is configured to:
receive a precoded SRS from the user equipment, wherein the precoded SRS is generated by precoding the SRS using the precoding information; and
receive the SRS from the user equipment at a time other than a sending time of the precoded SRS, and
wherein the first information is based on a demodulation reference signal (DMRS) or uplink service data.

21. The base station according to claim 20, wherein the first information triggers the user equipment to determine the precoding information of the SRS.

22. The base station according to claim 21, wherein the transmitter is further configured to send a downlink reference signal in a wireless communication system using a time division duplex mode, wherein the downlink reference signal is used to determine the precoding information of the SRS, and wherein the downlink reference signal is a channel state information reference signal (CSI-RS).

23. The base station according to claim 20, wherein the transmitter is further configured to send second information to the user equipment, wherein the second information indicates the sending time of a precoded signal.

* * * * *

UNITED STATES PATENT AND TRADEMARK OFFICE
CERTIFICATE OF CORRECTION

PATENT NO. : 10,880,127 B2  
APPLICATION NO. : 16/131599  
DATED : December 29, 2020  
INVENTOR(S) : Jian Zhang et al.

Page 1 of 1

It is certified that error appears in the above-identified patent and that said Letters Patent is hereby corrected as shown below:

In the Claims

In Column 17, Line 16, Claim 8, delete "the SRS,".

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*